(12) United States Patent
Lemke

(10) Patent No.: US 6,169,133 B1
(45) Date of Patent: Jan. 2, 2001

(54) GLYCEROL MONOSTEARATE BLENDS AS ANTISTATS IN POLYOLEFINS

(75) Inventor: Daniel W. Lemke, Jersey Shore, PA (US)

(73) Assignee: Lonza Inc., Fair Lawn, NJ (US)

( * ) Notice: Under 35 U.S.C. 154(b), the term of this patent shall be extended for 0 days.

(21) Appl. No.: 08/882,047

(22) Filed: Jun. 25, 1997

(51) Int. Cl.$^7$ ....................................................... C08K 5/09

(52) U.S. Cl. ............................................ 524/287; 524/317

(58) Field of Search ...................................... 524/317, 287

(56) References Cited

U.S. PATENT DOCUMENTS

| | | | | |
|---|---|---|---|---|
| 4,518,731 | * | 5/1985 | Zamboni et al. | 524/166 |
| 4,704,421 | * | 11/1987 | Teskin | 524/287 |
| 4,801,637 | * | 1/1989 | McCullough, Jr. | 524/287 |
| 5,023,286 | * | 6/1991 | Abe et al. | 524/128 |

* cited by examiner

*Primary Examiner*—Peter D. Mulcahy
(74) *Attorney, Agent, or Firm*—Darby & Darby

(57) ABSTRACT

The present invention provides antistatic blends which comprise either HMS, benzoic acid, and sodium benzoate or HMS and benzoic acid. Also provided are polyolefin compositions which comprise the antistatic blends of the invention, and methods for making the antistatic blends of the composition.

8 Claims, 4 Drawing Sheets

GLYCEROL MONOSTEARATE BLENDS AS ANTISTATS IN POLYOLEFINS

FIELD OF THE INVENTION

The present invention relates to blends of glycerol monostearate and other compounds that improve the antistatic properties of polyolefins.

BACKGROUND OF THE INVENTION

Plastics are excellent insulators and have a tendency to generate and retain static charges. Static charges on bottles and other packaging products charge dust particles in the air by induction. The dust particles acquire a charge of the opposite polarity than the plastic package, and so are attracted to the package. Dust attracted to the packages of consumer products makes them less attractive. Plastic resin powders can explode when they generate a static charge. Static charged sheets of plastic are difficult to separate, and static charged plastic products are an explosion hazard in areas where flammable gases are used. Electronic circuit chips are susceptible to damage from static charged plastic packaging. Thus, there is a clear need in the plastic art for effective antistatic agents.

Antistatic agents may be applied to the surface of the finished article or incorporated in the bulk of the polymer during processing. They function by decreasing the rate of charge generation, by increasing the rate of charge dissipation, or by both mechanisms.

Plastics are rendered static dissipative by either adding a conductive material to the plastic in sufficient quantity that there is a three-dimensional conductive pathway through the plastics, or by adding to the plastic a surfactant-type chemical that will attract moisture to the surface of the plastic. Since water is a conductor, the surface layer of moisture then dissipates a static charge. The source of conductive material can be either an inherently conductive polymer, a metal or metal-containing material, or carbon black. The conductive additive can be added to the plastic at a high enough concentration make it static dissipative, but not completely conductive. Surfactant-type additives are of several different chemical types. They can be applied to the surface of the finished plastic article or incorporated in the bulk of the polymer when the polymer is made.

Conducting polymers are polymers with a pi-electron backbone capable of passing an electrical current. These polymers generally are not sufficiently conductive as neat polymers but require the inclusion of an oxidizing or reducing agent (dopant) to render them conductive.

Common conductive polymers are polyacetylene, polyphenylene, poly (phenylene sulfide), polypyrrole, and polyvinylcarbazole. A static-dissipative polymer based on a polyether copolymer has been announced. In general, electroconductive polymers have proven to be expensive and difficult to process. In most cases they are blended with another polymer to improve the processibility. Conductive polymers have met with limited commercial success.

Metal-containing polymers function simply by adding sufficient quantities of a metal to form a three-dimensional conduction pathway through the plastic. The metal is in the form of a powder, micrometer-sized needles, or as a thin coating on glass spheres, carbon fibers, or mica. The metals normally employed are nickel, zinc, stainless steel, copper, and aluminum. At higher levels these materials make the polymer capable of shielding electromagnetic impulses (EMI). Metals are typically not useful in applications where the plastic product is to be optically clear, i.e., transparent.

Inherently conductive antistats have the advantage of not being dependent on atmospheric moisture to function. Their drawbacks include expense, coloration of the plastic, and alteration of the mechanical properties of the plastic. The added stiffness caused by conductive fillers may not be a problem with a rigid containers, but it can be a problem for a flexible bag.

Surfactant-type antistats find the widest use because of their low cost and minimal effect on the mechanical properties of the plastic. Ease of use is another favorable aspect to surfactants. They can be mixed with the bulk of the plastic prior to processing or can be applied to the surface of the finished plastic article as the need dictates.

Internal surfactant antistats are physically mixed with the plastic resin prior to processing. When the resin is melted, the antistat distributed evenly in the polymer matrix. The antistat usually has some degree of solubility in the molten polymer. However, when the polymer is processed (extruded, molded, etc) into its final form and allowed to cool, the antistat migrates to the surface of the finished article due to its limited solubility in the solidified resin. The molecule of a surface-active agent is composed of a polar hydrophilic portion and a nonpolar hydrophobic portion. The hydrophilic portion of the surfactant at the surface attracts moisture from the atmosphere; it is the moisture that has the static dissipative effect.

Because the antistatic effect only occurs after the surfactant has migrated to the surface, the solubility of the surfactant in the polymer is an important consideration. Surfactants can generally be classified as one of four chemical types: cationic, where the hydrophilic portion has a positive charge; anionic, where the hydrophilic portion has a negative charge, nonionic, where the hydrophile does not have a charge; and amphoteric, where the molecule contains both positive and negative charges.

Cationic, anionic, and amphoteric surfactants derive their water solubility from their ionic charge, whereas the nonionic hydrophile derives its water solubility from highly polar terminal groups such as hydroxyl. Cationic surfactants perform well in polymers like styrenics and polyurethane. Examples of cationic surfactants are quaternary ammonium chlorides, quaternary ammonium methosulfates, and quaternary ammonium nitrates. Anionic surfactants work well in PVC and styrenics. Examples of anionic surfactants are fatty phosphate esters and alkyl sulfonates.

Nonionic surfactants have been found to perform well in nonpolar polymers such as polyethylene and polypropylene. Examples of nonionic surfactants are ethoxylated fatty amines, fatty diethanolamides, and mono- and diglycerides. Amphoteric surfactants find little use in plastics. Currently, the standard antistatic agent used in polyolefins is what is known as HMS, a high glycerol monostearate-containing blend of fatty esterified glycerin. HMS contains glycerol mono-, di-, and tri-stearate, and glycerol; for the composition to be considered "high-monostearate", it must contain greater than 52% glycerol monostearate, preferably from 52 to 57% glycerol monostearate. However, there is a need in the polyolefin art for compositions which impart even greater antistatic properties than HMS, and which are economical, easy to formulate and incorporate into polyolefins.

SUMMARY OF THE INVENTION

It has now been surprisingly and unexpectedly discovered that excellent antistatic properties can be achieved in polyolefins by the addition of blends of either HMS:benzoic acid:sodium benzoate or of HMS:benzoic acid. The blends are prepared by mixing the ingredients together and heating until a clear, homogeneous solution is obtained. A usable form, which can be either beads or flakes, can then be prepared for end users to incorporate into polyolefins.

The antistatic blends of the invention have the following desirable characteristics:

1. They are equally efficacious antistatic agents and have been shown to do provide greater antistatic activity than the current state of the art product, HMS.

2. The HMS:benzoic acid blend is clear and flowable as a melt, and is almost four times more stable to transesterification mono reversion, than blends of HMS:sodium benzoate:benzoic acid and six times more stable than blends of HMS:sodium stearate.

3. Both blends can be beaded without reducing the mono content of the HMS or losing the performance advantages gained.

The invention also encompasses polyolefins which comprise the antistatic blends of the present invention and polyolefin products formed from the polyolefins and the antistatic blends of the present invention. Also within the scope of the present invention are methods for producing the antistatic blends and methods for producing polyolefins which comprise the antistatic blends of the invention.

DESCRIPTION OF PREFERRED EMBODIMENTS

Figure 1:
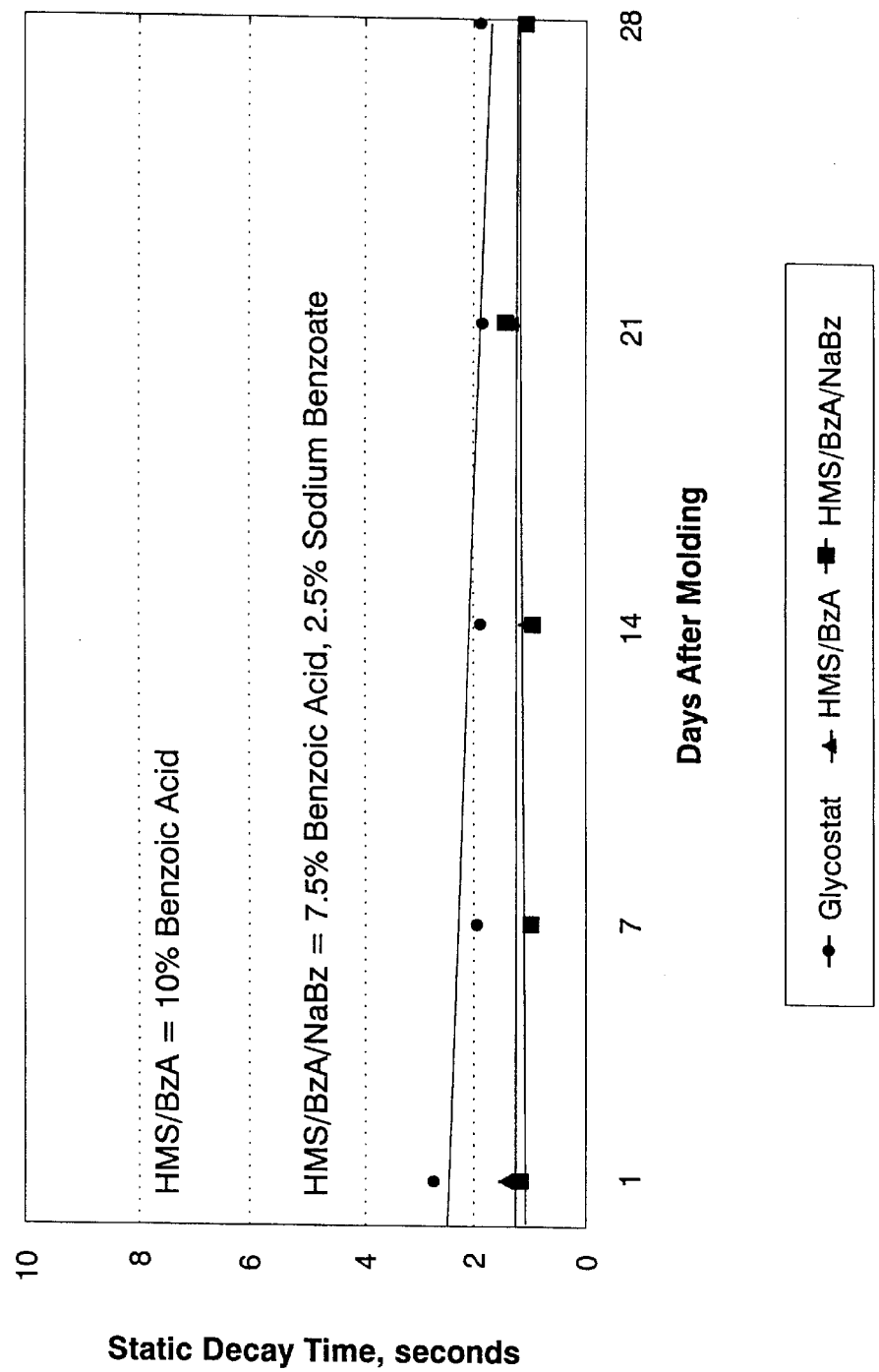
FIG. 1 is a graph showing the static decay times in polypropylene which result when 0.5 percent of Glycostat, 0.5 percent HMS/benzoic acid, and 0.5 percent HMS/benzoic acid/sodium benzoate are included in the polypropylene.

The present invention encompasses blends of HMS and benzoic acid and, optionally, sodium benzoate, with antistatic properties. These antistatic blends can be incorporated in polyolefin plastics to decrease the buildup of static electricity on the surface of such plastics. Other compounds that can be used with HMS to reduce static in polyolefins are toluene sulfonic acid and its salts, and phthalic acid and its salts.

It is desirable that antistatic compositions for inclusion in plastic be "beadable", i.e., a clear, homogeneous melt which when sprayed through a nozzle into a jet of cold air, forms solid drops, or "beads", of relatively uniform size. These beads can then be added to melted polyolefins prior to the polyolefins being blown or injection molded into their final form.

The antistatic compositions of the present invention comprise, in either their solid or melted form, mixtures of HMS and benzoic acid, or mixtures of HMS, benzoic acid, and sodium benzoate.

The HMS/benzoic acid antistatic composition comprises between about 70 and 99 percent HMS, and between about 1 and about 30 percent benzoic acid. The composition preferably comprises between about 75 and about 95 percent HMS, and between about 5 and about 25 percent benzoic acid. Most preferably, the composition comprises about 90 percent HMS, and about 10 percent benzoic acid.

The composition is produced by mixing and heating HMS and benzoic acid until homogeneous to a temperature between about 60 and 10C, preferably between about 70 and 95° C., and most preferably about 80° C., to provide a homogeneous solution that is optically clear and free of particulates, i.e., there is no unmelted or undissolved solids in the solution. The mixture is then beaded using well-known methods. Typically, the mixture is forced through a nozzle under pressure, causing drops of relatively uniform size to form. These drops are then cooled with a stream of cold air, and solidify in the form of uniformly sized beads. Alternatively, the antistatic composition can be solidified in the form of flakes, by spreading the molten liquid, at about 70–90° C., evenly at a thickness of from about 1–5 mm over a smooth chilled surface, which is at a temperature of from about 10–30° C., and allowing the composition to solidify. The solid material is then peeled off of the surface and broken into the desirable flake size.

The HMS/benzoic acid/sodium benzoate antistatic composition comprises between about 70 and 95 percent HMS, between about 1 and 25 percent benzoic acid, and between about 1 and 5 percent sodium benzoate. The composition preferably between about 80 and 95 percent HMS, between about 5 and 15 percent benzoic acid, and between about 1 and 3 percent sodium benzoate. Most preferably, the composition comprises about 90 percent HMS, about 7.5 percent benzoic acid, and about 2.5 percent sodium benzoate.

The HMS/benzoic acid/sodium benzoate antistatic blend is produced in essentially the same manner as the HMS/benzoic acid composition as detailed above, except that sodium benzoate is added to the composition. The mixture is then beaded or flaked as described above for the HMS/benzoic acid mixture.

Polyolefins are the polymers in which the present invention works. In the antistatic blends of the present invention, the antistatic portion comprises between about 0.1 and about 3.0 percent by weight of the total weight of the polyolefin/antistatic blend mixture, preferably between about 0.1 and about 2.0 percent by weight, and most preferably between about 0.3 and 0.8 percent by weight.

The antistatic blends of the present composition are mixed with polyolefins according to standard methods in the art, such as by melt-compounding in an extruder. One such extruder is the Werner & Pfleiderer co-rotating twin screw extruder, Model ZSK-30. Powdered raw materials are fed into the extruder using, for example, a K-Tron volumetric feeder, Model S-200, equipped with a closed flighted single screw. A typical screw speed is 250 rpm, and for polyolefins general purpose screw configurations can be used. A typical extruder temperature profile is settings at 175, 190, and 190° C. with a die temperature of 195° C. Variations on these settings and equipment are well-known to those of ordinary skill in the art. Once a homogeneous polyolefin/antistatic blend mixture is achieved, it can then be molded into a polyolefin-comprising product, using injection- or blow-molding techniques which are well-known in the art.

Polyolefins to which antistatic properties can be imparted by the blends of the present invention include, without limitation, high- and low-density polyethylene, polypropylene, and polystyrene.

EXAMPLES

Blends of HMS:benzoic acid: sodium benzoate (90:7.5:2.5) and HMS:benzoic acid (90:10) were prepared and tested for antistatic properties in polypropylene.

The antistatic activity of the HMS:benzoic acid: sodium benzoate (90:7.5:2.5) and HMS:benzoic acid (90:10) blends were compared to the antistatic activity of Glycostat™, Glycolube 825™, and Glycolube 140™, three commercially available HMS-containing antistatic agents. Glycostat™ and Glycolube 140™ are comprised of HMS. Glycolube 825™ is a low-mono-containing GMS (40–45%). The compositions were evaluated in polypropylene at concentrations of 0.3 and 0.5% of the total weight of the combined polypropylene and antistatic composition in a 28-day antistatic test. The test was run in duplicate.

Figure 2:
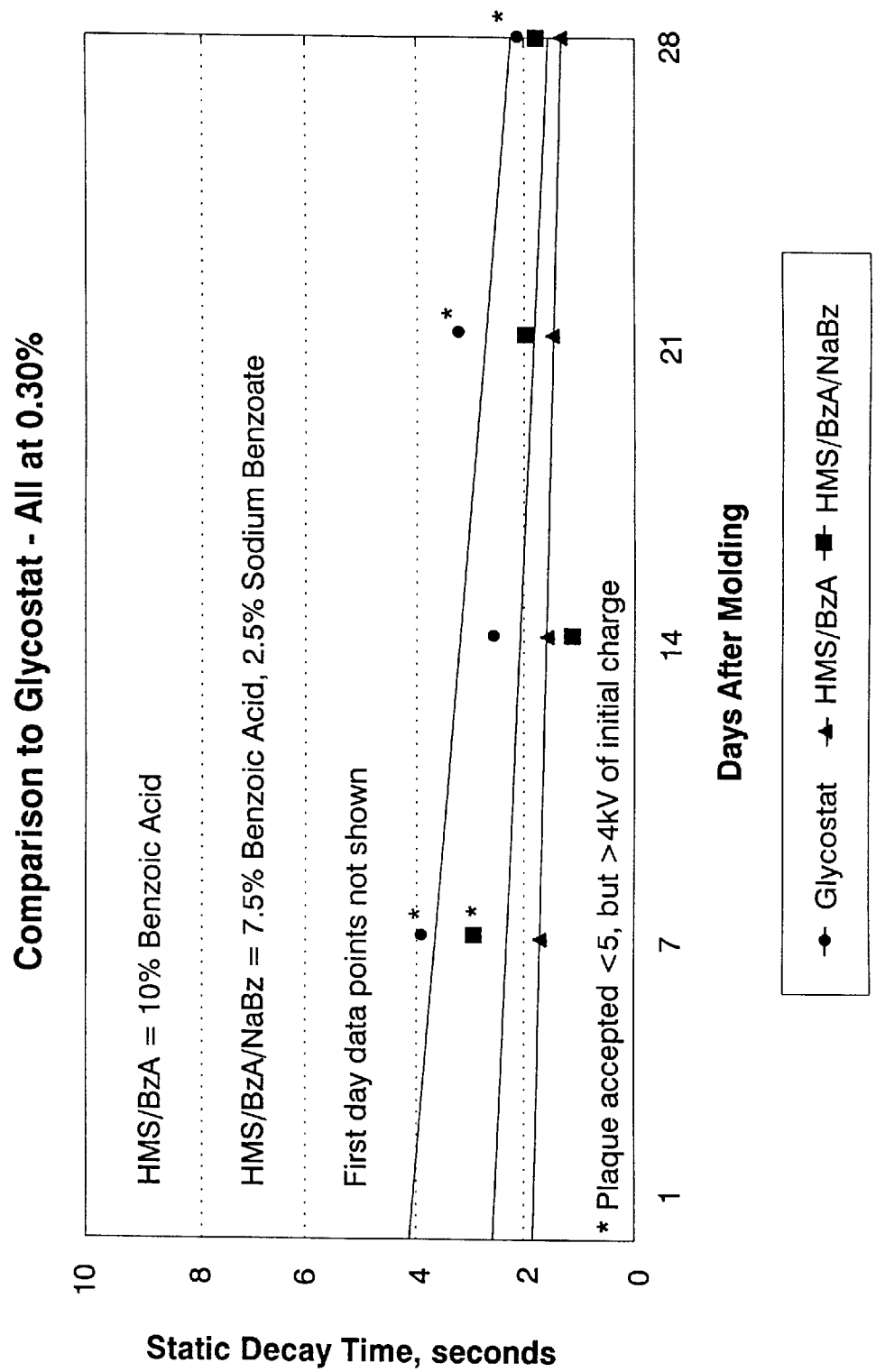
FIG. 2 is a graph showing the static decay times in polypropylene which result when 0.3 percent of Glycostat, 0.3 percent HMS/benzoic acid, and 0.3 percent HMS/benzoic acid/sodium benzoate are included in the polypropylene.
Figure 3:
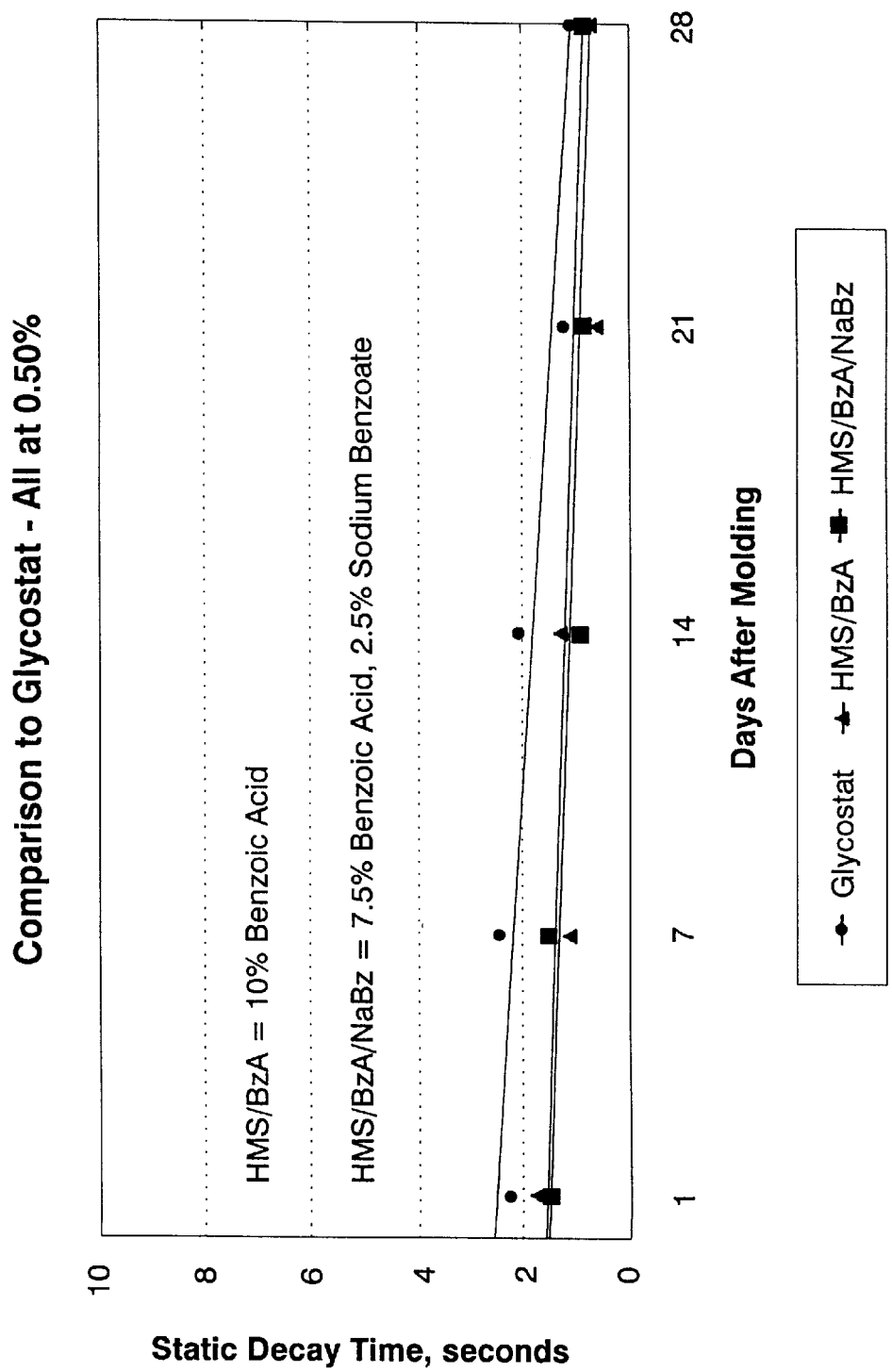
FIG. 3 is a graph showing the results of a second test of static decay times in polypropylene which result when 0.5 percent of Glycostat, 0.5 percent HMS/benzoic acid, and 0.5 percent HMS/benzoic acid/sodium benzoate are included in the polypropylene.
Figure 4:
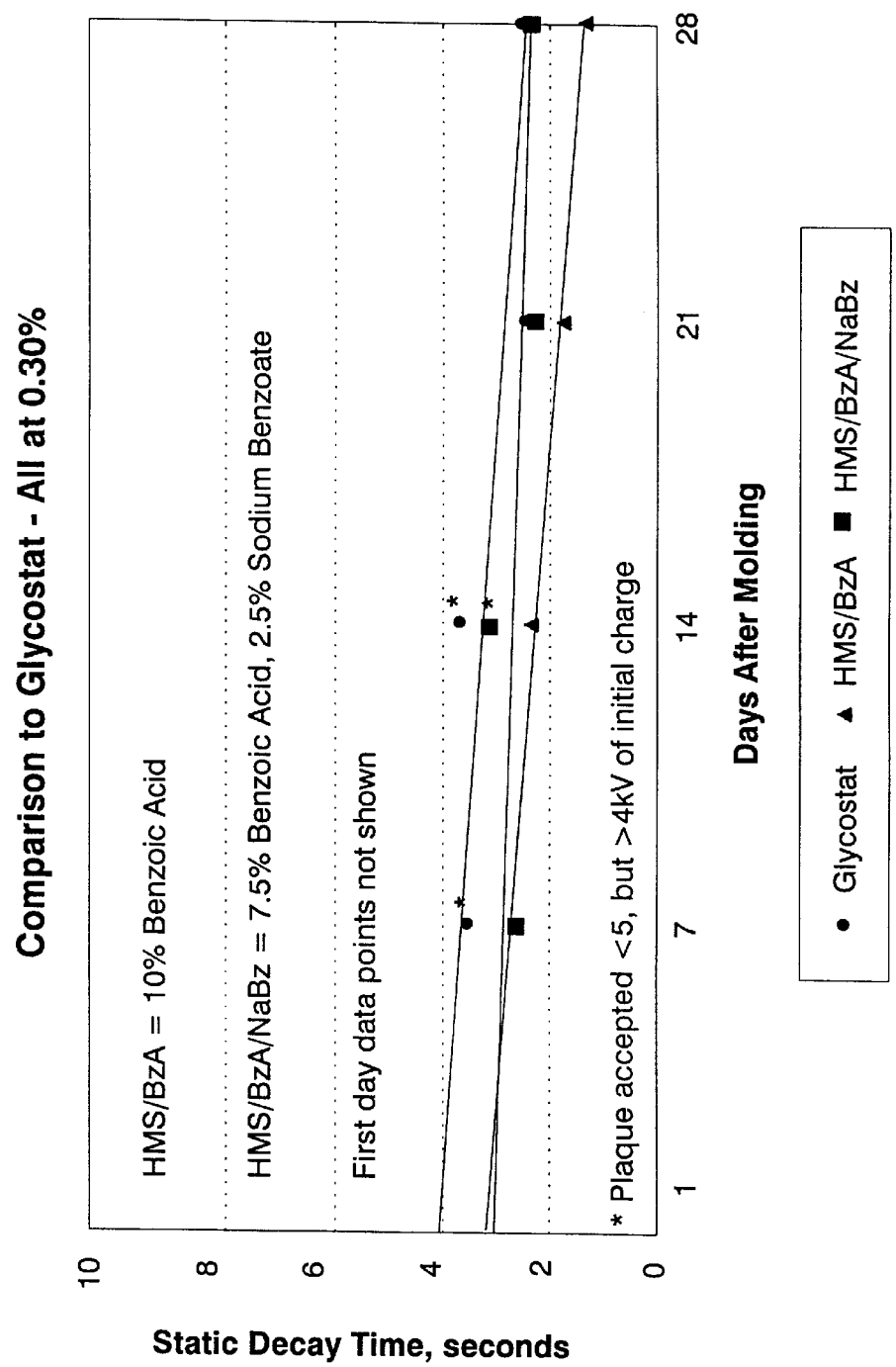
FIG. 4 is a graph showing the results of a second test of the static decay times in polypropylene which result when 0.3 percent of Glycostat, 0.3 percent HMS/benzoic acid, and 0.3 percent HMS/benzoic acid/sodium benzoate are included in the polypropylene.

The data from the comparison is presented in Table 1, below, and in FIGS. 1 to 4. The units of the data in the tables reflect static decay time, in seconds. Static decay times were measured with an Electro-tech Systems Static Decay Meter, Model 406C, equipped with a humidity chamber. Samples were conditioned for 24 hours at 23+2.5 C and 50+2% relative humidity prior to testing. Voltages of +5 kV and –5 kV were applied to the sample, and the time for the accepted charge to dissipate to 10% of its original value was recorded.

TABLE 1

| Days after molding | 1 | 7 | 14 | 21 | 28 |
|---|---|---|---|---|---|
| First Test at 0.50% (all antistatic agents) in Polypropylene | | | | | |
| Glycolube 825 (control 1) | 1.60 | 2.07 | 0.94 | 1.21 | 1.09 |
| Glycostat (control 2) | 2.74 | 1.98 | 1.91 | 1.87 | 1.90 |
| HMS + 10% benzoic acid | 1.46 | 0.99 | 1.14 | 1.33 | 1.21 |
| HMS/benzoic acid/sodium benzoate: 90/7.5/2.5 | 1.19 | 1.02 | 1.03 | 1.43 | 1.11 |
| First Test at 0.30% (all antistatic agents) in Polypropylene | | | | | |
| Glycolube 825 (control 1) | 4.66 | 4.90 | 3.48 | 4.78 | 3.62 |
| Glycostat (control 2) | 8.62 | 3.92 | 2.59 | 3.28 | 2.15 |
| HMS + 10% benzoic acid | 3.56 | 1.75 | 1.57 | 1.55 | 1.35 |

TABLE 1-continued

| Days after molding | 1 | 7 | 14 | 21 | 28 |
|---|---|---|---|---|---|
| HMS/benzoic acid/sodium benzoate: 90/7.5/2.5 | 6.17 | 2.95 | 1.12 | 2.02 | 1.81 |
| Second Test at 0.50% (all antistatic agents) in Polypropylene | | | | | |
| Glycolube 140 (different control 1) | 0.85 | 0.92 | 0.98 | 1.23 | 1.11 |
| Glycostat (control 2) | 2.20 | 2.47 | 2.14 | 1.27 | 1.20 |
| HMS + 10% benzoic acid | 1.67 | 1.09 | 1.34 | 0.86 | 0.91 |
| HMS/benzoic acid/sodium benzoate: 90/7.5/2.5 | 1.48 | 1.53 | 0.99 | 0.99 | 1.09 |
| Second Test at 0.50% (all antistatic agents) in Polypropylene | | | | | |
| Glycolube 140 (different control 1) | 2.51 | 2.83 | 1.62 | 1.54 | 1.57 |
| Glycostat (control 2) | 4.91 | 3.51 | 3.68 | 2.47 | 2.50 |
| HMS + 10% benzoic acid | 4.13 | 2.63 | 2.43 | 1.81 | 1.31 |
| HMS/benzoic acid/sodium benzoate: 90/7.5/2.5 | 5.54 | 2.63 | 3.16 | 2.26 | 2.35 |

The data illustrate that the antistatic blends of the present invention provide superior antistatic properties (i.e., shorter static decay times) in polyolefins when incorporated as an internal antistatic agent, when compared with the antistatic agents that are presently state of the art, i.e., those based solely on HMS.

What is claimed is:

1. An antistatic composition which comprises from about 80 to about 95% by weight of HMS, from about 5 to about 15% by weight of benzoic acid, and optionally, up to about 3% by weight of sodium benzoate, based upon 100% total weight of composition.

2. The antistatic composition of claim 1 which comprises about 90 weight % HMS and about 10 weight % benzoic acid.

3. The antistatic composition of claim 1 which comprises about 90 weight % HMS, about 7.5 weight % benzoic acid, and about 2.5 weight % sodium benzoate.

4. A polyolefin containing the antistatic composition of claim 1.

5. A polyolefin containing the antistatic composition of claim 2.

6. A polyolefin containing the antistatic composition of claim 3.

7. The composition of claim 4 wherein said antistatic composition is present in an amount between about 0.1 and 2.0 weight %.

8. The composition of claim 7 wherein said antistatic composition is present in an amount between about 0.3 and 0.5 weight %.

* * * * *